United States Patent [19]

Beach

[11] Patent Number: 4,618,502

[45] Date of Patent: Oct. 21, 1986

[54] PROCESS FOR CONVERTING CASEIN TO CASEINATE

[76] Inventor: Marvin F. Beach, 2899 Arthington Blvd.-P.O. Box 18298, Indianapolis, Ind. 46218

[21] Appl. No.: 638,979

[22] Filed: Aug. 8, 1984

[51] Int. Cl.$^4$ ............................................. A23C 21/06
[52] U.S. Cl. ..................................... 426/583; 426/580
[58] Field of Search ................................ 426/580, 583

[56] References Cited

U.S. PATENT DOCUMENTS

| | | | |
|---|---|---|---|
| 2,336,634 | 12/1943 | Peebles | 426/583 |
| 2,602,747 | 8/1952 | Meade | 426/580 |
| 2,682,467 | 1/1953 | Brereton et al. | 426/580 |
| 2,832,685 | 4/1958 | Scott | 426/580 |
| 3,074,796 | 1/1963 | Peebles et al. | 426/580 |
| 4,055,555 | 10/1977 | Badertscher et al. | 426/580 |

*Primary Examiner*—Raymond N. Jones
*Assistant Examiner*—Carolyn Paden
*Attorney, Agent, or Firm*—J. Helen Slough

[57] ABSTRACT

A caseinate product is produced by blending a pretreated whey having a pH above 8 with a casein wherein the blending is under heat less than 190° F. and at a pH above 6.5 to produce a caseinate product useful as a skim milk substitute in food products.

7 Claims, No Drawings

PROCESS FOR CONVERTING CASEIN TO CASEINATE

This invention relates to food industry processes for converting casein to caseinate and more particularly to processing milk whey solids or soy flour with casein to produce a caseinate useful as skim milk substitute in the manufacture of food products.

Whey is a common by-product of the manufacture of various cheese products wherein large proportions of milk are used in making cheese resulting in large amounts of whey by-product. When solids can be recovered as a useful product in powdered form such as disclosed in Jones U.S. Pat. No. 4,088,791 and the disclosure thereof is incorporated herein by reference. In the prior Jones patent acid whey and sweet whey were processed together into a suitable whey product useful as a replacement for the non-fat milk solids in food products such as flour mixes including bread mixes, cake mixes, pancake mixes, as well as other food mixes such as cream sauces, gravy mixes, ice creams and ice cream mixes and similar food mix preparations. Similarly, U.S. Pat. No. 3,560,220 discloses an edible composition comprising a dried emulsion of fat, emulsifier, caseinate and whey adapted for reconstitution with water or other liquid to provide a sour cream type topping.

It now has been found that whey can be utilized in a process for converting casein to caseinate by controlling the pH of the whey and heating the whey with casein for time sufficient to produce caseinate. The resulting caseinate product provides a highly nutritious, bland flavored substitute for skim milk and can be substituted directly for skim milk as a food additive without detracting from the odor, appearance, or functional characteristics of the other ingredients or of the final food products. It can also be used with skim milk to form a high milk protein product. The process of this invention comprises a highly desirable method of preparing a constant food product comprising a stabilized mixture of processed whey and caseinate. The process further utilizes the frequently excess whey by-product to produce a skim milk substitute. These and other advantages of this invention will become more apparent by referring to the detailed description of the invention and the illustrative examples.

Briefly, the invention pertains to a process for utilizing whey or soy flour to convert casein to caseinate comprising the steps of pretreating the whey by heating and adjusting the pH of the whey solution to above 8, and blending the pretreated whey with casein while maintaining heat and the pH of the blend above 6.5 for time sufficient to convert the casein to caseinate.

The process comprises the steps of pretreating whey, blending the whey with casein, and converting the blend of whey and casein to a caseinate under particular processing conditions hereinafter described.

Referring first to the whey starting materials processed in the invention, whey compositions can be acid whey, sweet whey, or a mixture of acid and sweet whey sometimes called medium acid whey. Sweet whey ordinarily contains lactose derivatives and typically is a by-product resulting from the manufacture of hard cheeses such as cheddar, swiss, brick, or mozzarella. Acid whey typically is a by-product from the manufacture of soft cheeses such as cottage cheese. Ordinarily whey is classified sweet or acid according to the lactic acid content wherein titratable acidity not less than 0.3% is classified acid whey and titratable acidity less than 0.16% is classified sweet whey. The category in between 0.16% and 0.3% is sometimes referred to medium acid whey. Although acid whey and sweet whey many times are not interchangeable, the process of this invention can utilize either acid or sweet whey or mixtures thereof Any kind of whey obtained from processing milk related products such as cheese or butter are useful whey products. Whey enters the cheese making process as a milk substance and emerges as a dilute watery solution of whey solids wherein the whey solution may contain between 5.5% and 7% and usually between 6% and 6.5% by weight whey solids. A typical whey composition comprises 5.8% to 6.5% solids comprising 0.5% to 2% fat, 0.7% to 10% ash, 1% to 17% protein, 65% to 88% lactose, and 0.1% to 12% lactic acid. The dilute whey solution is preferably condensed and the watery liquid removed to produce a condensed whey solution containing above about 35% whey solids and preferably between 40% and 50% whey solids by weight. The condensed whey solution can be produced by vacuum stripping at temperatures less than 190° F., to avoid scorching the whey. The typical pH of condensed whey solution ordinarily ranges between 3 and 5 and normally between 3.85 and 4.2.

Referring next to casein, the casein used in this process is a protein in chemical group generally known as albumins and is typically found in most animal milks. Casein can be obtained from milk products by precipitation with a minor amount of mineral acid such as dilute sulfuric, hydrochloric, or acetic acids. Casein exists as a caseinogen in most milks and is usually precipitated out in various food processes with an enzyme known as rennin or rennet, which is the case in the cheese making process.

In accordance with the process of this invention, whey obtained as a by-product from dairy processing operations such as the production of sweet dairy cheese is first condensed by concentrating the dilute whey solution into a concentrated whey solution. The by-product whey can be subjected to vacuum and heating up to about 190° F., for time sufficient to draw off the watery liquids and concentrate the whey solids up to at least about 35% and preferably between 40% and 50%. If the whey proteins need to be denatured, slightly higher temperatures can be used although considerable care should be exercised to avoid scorching. The heated whey solids can be then jetted onto an evaporator or spray dried. Spray drying typically involves atomized whey mixed with hot oil within cyclonic drying chamber whereby concentrated whey particles drop out the bottom of the dryer and are recovered. The pH of the condensed whey typically is between 3.85 and 4.2.

The concentrated whey can then be charged into a jacketted heating tank where the temperature of the concentrated whey is heated up to about 140° F., to assure complete homogenous dissolution of components including the lactose in the whey concentrate. The whey is then pretreated by adjusting the pH of the whey concentrate to above 8.0 and preferably between 8.5 and 10.5 by adding a food grade alkaline base such as sodium hydroxide, potassium hydroxide, calcium hydroxide, or magnesium hydroxide. Between 0.2% and 4% alkaline base addition should be sufficient to obtain the desired pH. The hydroxide material should be hydrated prior to adding to the whey concentrate. The neutralized whey concentrate is then maintained at temperatures up to 190° F. in preparation to being blended with casein.

The casein component can be pretreated similarly by neutralizing acidic casein with an alkali or alkaline earth metal base derivative and preferred base derivatives comprise magnesium, potassium, magnesium-potassium combinations, sodium-potassium combination, or sodium-magnesium combination bases. Combination base derivative bases are desired to produce highly desired preferred results. For instance, the combination of sodium-potassium produces a highly desirable mouthfeel which avoids a possible soapy mouthfeel of sodium caseinate alone or gummy mouthfeel due to potassium caseinate alone. By using a combination of base derivatives a relatively bland form of caseinate will ultimately form in a synergistic combination to provide a bland taste as well as very acceptable mouthfeel and advantageously overcomes the deficiencies of a single protein source alone.

The pretreated and heated whey then can be mixed with the neutralized casein at temperatures up to about 190° F. The pH of the resulting mixture must be above 6.5 and preferably above 7 for the casein to convert to caseinate. Conversion often takes between 5 and 20 minutes depending on the volumes and the temperature.

Other minor food grade additives can be added such as titanium dioxide powder or calcium chloride at levels of about 0.2 to 0.4% to provide a white mixture, monodiglyceride which technically comprises a mono- and diglyceride with a few percent of triglyceride. Monoglyceride should only be added to the whey concentrate at temperatures above 140° F. Emulsifiers can include fatty acid glycerides, glycerol esters of fatty acid, phospheric acid ester of glycerides, higher saturated fatty acids, partial esters of sorbitol, and polyoxyalkylene derivatives. The additive materials can be preblended and added to the whey concentrate at temperatures above 140° F. under high agitation. The useful weight ratios of whey solids that can be blended and converted into caseinet in accordance with this invention can comprise on a weight basis between about 40% and 90% whey solids and between about 10% and 60% casein solids.

The resulting caseinate produced in accordance with this invention comprises a caseinate concentrate desirably containing a solids content level above about 20% by weight. Casein can be converted for example with raw cheese whey of 6% to 9% solids, cream and up to about 40% fat to produce a sour cream, and vegetable fat of about 18% and water to produce a final solids content of fat and caseinate of about 30% to produce an imitation sour cream. Combining 70% whey solids with 30% by weight casein provides a direct replacement for skim milk for use in food products. A whey concentrate containing 43% solids concentrate combined with dry casein can provide a 48% concentrated skim milk replacement or substitute. The caseinate product produced by the process in accordance with this invention can be used as a substitute for skim milk in producing or preparing various food products wherein the nutritious or functional characteristics can be adjusted by adjusting the relative amounts of whey solids and casein solids and can be dried or shipped as a concentrate.

The merits of this invention will become further apparent from the following illustrative examples.

EXAMPLE 1

About 100 pounds of dilute whey were added to a heated mixing tank and subjected to high agitation. About 0.5 pounds of food grade alkaline of 1 part calcium hydroxide plus 11 parts of magnesium hydroxide were added to the whey to adjust the pH to 8. Then 25 pounds of acid casein were added, whereupon the mixture was mixed at temperatures of about 180° F. for about 15 minutes at a pH of about 8 to convert the casein to caseinate. About 0.03 pounds of emulsifier was added along with 0.5 pounds of food grade titanium dioxide to produce a skim milk substitute found to be useful in ice cream and other frozen desserts.

EXAMPLE 2

Sweet whey in sour cream useful as a sour cream substitute was produced as follows. Regular cream having a butterfat content of 18% to 40% was concentrated to provide a whey solids content of about 40%. Small amounts of emulsifier and pasteurizer were added. Calcium hydroxide was added to provide a pH of about 8.5. Casein was added in the approximate proportions of Example 1. The mixture was heated at about 170° F. at a pH of about 8 for about 15 minutes. The result was a sour cream product having the flavor characteristics of conventional sour cream.

In this application wherever the term "whey solution" appears, it is to be understood that the whey solution as used may be derived or inherent in skim or whole milk.

The foregoing is descriptive and illustrative of the invention but is not intended to be limiting except by the appended claims.

What I claim is:

1. A process for converting casein to caseinate, comprising the steps of
   pretreating a concentrated whey solution by heating to a temperature of 140° F. and adjusting the pH of said preheated solution to above about 8 to provide a pretreated wey solution;
   blending neutralized casein with the pretreated whey solution at temperatures up to about 190° F., thereby producing a mixture having a pH above 6.5 thus producing a blend comprising by weight between 40% and 90% whey solids and between about 10% and 60% casein solids;
   thereby converting said blend to caseinate.

2. The process in claim 1 wherein the whey is pretreated with a food grade alkali base to adjust the pH to above 8.

3. The process of claim 2 wherein the alkali base is selected from sodium hydroxide, potassium hydroxide, calcium hydroxide, or magnesium hydroxide.

4. The process in claim 1 wherein the casein is pretreated with a food grade alkali or alkaline earth base derivative prior to blending with said whey.

5. The process in claim 4 wherein the base derivative is a combination base derivative.

6. The process in claim 5 wherein the combination base derivative is selected from a magnesium-potassium base derivative, a sodium-potassium base derivative, or a sodium-magnesium base derivative.

7. The process in claim 1 wherein the whey solution is a concentrated whey solution.

* * * * *